UNITED STATES PATENT OFFICE.

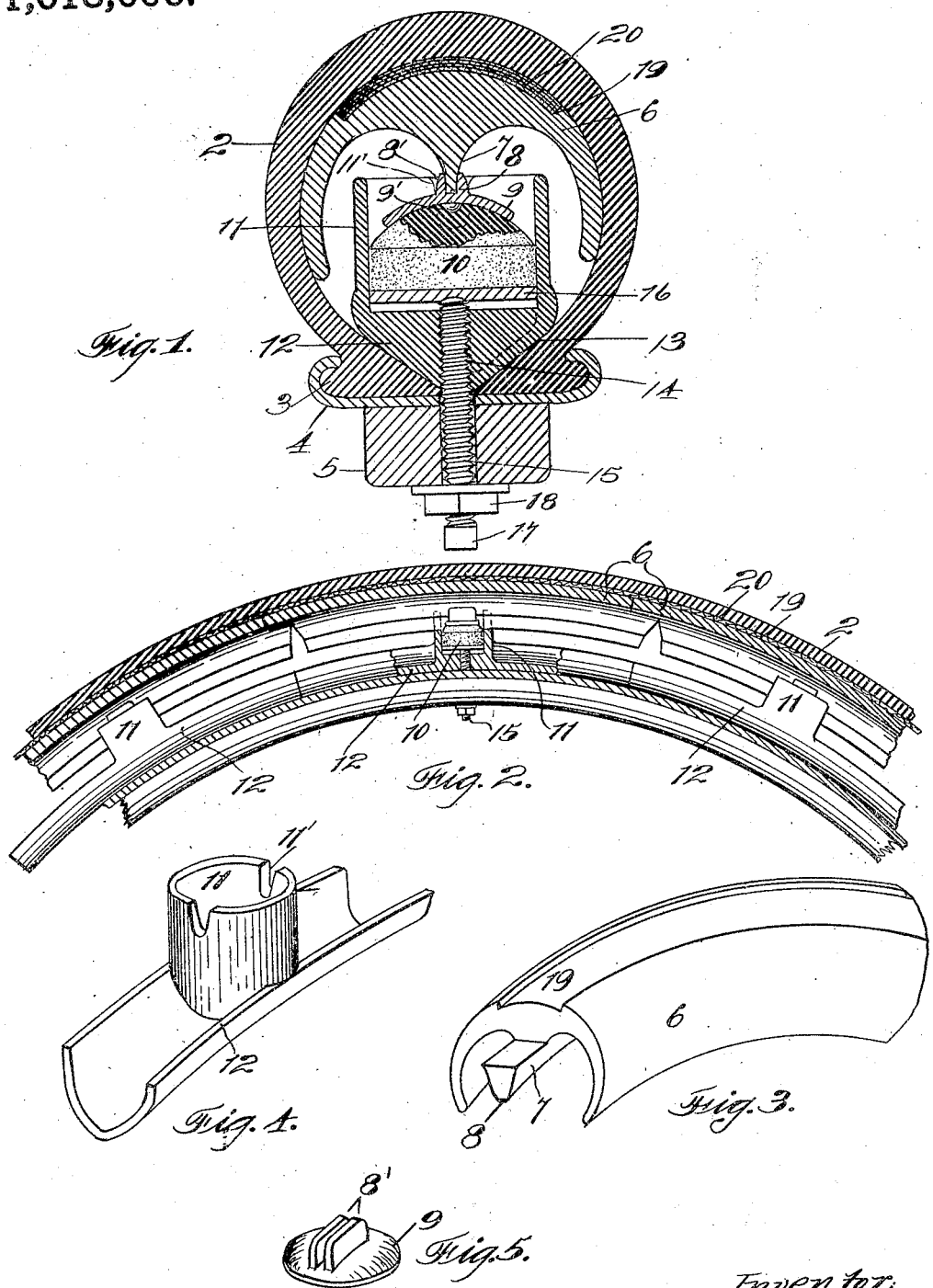

MARSHALL C. ROGERS, OF WILLIAMS, CALIFORNIA.

RESILIENT TIRE.

1,018,006.  Specification of Letters Patent.  Patented Feb. 20, 1912.

Application filed August 29, 1910. Serial No. 579,507.

*To all whom it may concern:*

Be it known that I, MARSHALL C. ROGERS, citizen of the United States, residing at Williams, in the county of Colusa and State of California, have invented new and useful Improvements in Resilient Tires, of which the following is a specification.

This invention pertains to vehicle tires, and is more especially pertinent to composite resilient hollow tires.

The object of this invention is to provide a non-puncturable tire which will afford the desired degree of resiliency and be the equivalent in function to the common form of pneumatic tires; to provide a tire comprised of a standard casing in combination with a plurality of members adapted to support the outer casing in a manner substantially as yieldable as an ordinary pneumatic tire; and to provide a vehicle tire which is free from all metallic springs, and which is therefore not liable to become injured by breakage of any springs, and which does not depend upon an air cushion for its resiliency.

The invention consists of the parts and construction and combination of parts as hereinafter more fully described and claimed having reference to the accompanying drawings, in which—

Figure 1 is a transverse section through the tire and wheel felly. Fig. 2 is a longitudinal section through the same. Fig. 3 is a perspective view of a sectional filler. Fig. 4 is a perspective view of a socket section. Fig. 5 is a perspective view, in partial section, of a spreader plate.

In the present embodiment of my invention I have shown the tire as comprising a standard or suitable outer casing 2, having clencher shoulders 3 adapted to be embraced by the usual clencher rim 4 mounted in any suitable manner upon the felly 5 of the wheel.

My invention is designed to substitute and entirely dispense with the usual inner inflation tube of pneumatic tires, and in lieu thereof I employ a segmental filler 6 of arched cross-section, which may be of any suitable material. This filler may be erected of a plurality of segments. A central, depending web, as ridge 7, projects inwardly from below the arch of each section 6 and the face 8 of this web is adapted to bear upon a spreader foot-plate 9 of which there are a plurality employed in the wheel, and each of which is supported upon a suitable buffer or resilient cushion 10.

Each of the several spreader feet-plates 9 is provided with a small hemispherical knob or projection 9' at the center of its concaved face, and this knob or projection 9' seats itself in a small concavity at the crown of the resilient cushion 10.

The rib 7 of the several segmental fillers 6 is retained on top of the spreader or follower plate 9 against excessive lateral movement by suitable upwardly projecting parallel flanges 8'. The top edge of the cup 11 is oppositely slotted as at 11' to allow for the clearance of the depending rib 7, and by this structure when the casing 2 is subjected to side strains, as in skidding, the web 7 will be brought into contact with the walls 8' and 11', respectively, and supported. Thus, I allow an ample amount of transverse or substantially universal movement of the sectional filler 6 relatively to the central key blocks 12 so that the casing may rock independently of the clencher rim 4 to a certain degree. These buffers or cushions 10, which may be of rubber or any other appropriate material and of any suitable and preferred shape, are mounted in cups 11 which are formed integrally with, or attached to, segmental blocks 12 which are designed to conform closely with the contour of the inner surface 13 of the clencher members 3 of the tire. The blocks 12 therefore, when resting upon the concaved inwardly extending surfaces 13 of the tire casing 2 form keys whereby the clencher lips 3 are pressed outwardly and into close engagement with the clencher flanges 4. A sufficient number of the segmental blocks or keys are provided to afford a substantially continuous though interrupted sectional ring bearing upon the faces 13 of the casing 2 insuring the positive engagement of the casing with the clencher rings. By this structure it will be seen that the expansion of the buffer member 10 uplifting the spreader foot 9 will thrust outwardly the sectional circular filler 6 substantially expanding the hollow casing 2 and supporting this in a manner similar to an inflated casing.

In order to provide the necessary degree of firmness and rigidity in the casing 2 the several key blocks 12 are suitably threaded as at 14, and are adapted to receive a threaded bar 15 which is passed upwardly through the felly 5 and the clencher ring 4 and into the threaded perforation of the blocks 12. Upon that end of the screw which passes into the socket portion 11 of the blocks is seated a disk or plate 16 conforming closely to the area of the cavity of the socket 11, and supporting the resilient buffer 10; thus by turning the screw by its polygonal end 17 the screw advances through the threads 14 drawing the block 12 firmly down upon the clencher members 3 of the casing, and passing inwardly lifts the supporting plate 16 thus compressing or elevating the resilient cushion 10 from which the pressure is transferred to plate 9, and thence through the annular rib 7 projecting the filler sections 6 outwardly and into firm engagement with the interior surface of the casing 2. A lock nut 18 is provided adjacent the inner end 17 of the screw 15, and is adapted to firmly secure the bolt or screw 15 in its adjusted position.

It is desirable to form a slight exterior concavity or recess 19 in the exterior of the filler 6 and in this concavity which will be made continuous by the abutment of the several sections 6, I lay or build up a fibrous lamina 20, which bears against the inner portion of the casing 2 at the point most subjected to pressure from the tread portion of the casing 2. The purpose of this fibrous lamina 20 is to prevent the abrasion and injury to the filler 6 in the event of the exterior casing 2 becoming excessively warm.

Having thus described my invention, what I claim and desire to secure by Letters Patent is—

1. In a vehicle tire, the combination of a flexible, circular continuous casing, having clencher shoulders and clencher rings adapted to engage the same, a felly upon which said clencher rings are supported, a plurality of sectional key-blocks having cups formed thereon, said key blocks having screws passing through the felly whereby the casing is expanded and retained in the clencher rings, and means interposed between the interior surface of the casing and the key blocks whereby the casing is resiliently supported, said means including a non-inflatable filler and a cushion support therefor, said filler having a centrally disposed web on its interior, and said support being inclosed by a key-block cup and having a channeled portion to receive said web edgewise.

2. A vehicle tire comprising a hollow circular endless casing a clencher rim adapted to clamp the same, means whereby the casing is expanded into engagement with the clencher rings, a circular sectional filler of arched cross section mounted within the casing having a centrally disposed web on its inner surface, and an adjustably mounted cushion having a channel in which the web is edgewise supported whereby the filler is projected outwardly against the interior surface of the casing.

3. The combination in a vehicle tire of a hollow, flexible endless casing, clencher members therefor, blocks whereby said casing is expanded into locking engagement with the clenchers a cup formed upon said blocks, a resilient cushion mounted in said cup, a spreader foot resting upon a surface of the resilient cushion, and means comprising sectional, transversely arched fillers each having a central portion in contact with the spreader-foot whereby the casing may be expanded and supported.

4. The combination in a vehicle tire of a hollow, flexible endless casing, clencher members therefor, blocks whereby said casing is expanded into locking engagement with the clenchers, a cup formed upon said blocks, a resilient cushion mounted in said cup, a spreader plate resting upon a surface of the resilient cushion, means comprising sectional transversely arched fillers each having a central portion in contact with the spreader-foot whereby the casing may be expanded and supported, and a device whereby said cushion member may be adjusted within the cup.

5. The combination in a vehicle tire of a hollow, flexible endless casing, clencher members therefor, keys whereby said casing is expanded into locking engagement with the clenchers, a cup formed upon said keys, a resilient cushion mounted in said cup, a spreader plate resting upon a surface of the resilient cushion, means comprising sectional transversely arched fillers each having a central portion in contact with the spreader-foot whereby the casing may be expanded and supported, a device whereby said cushion member may be adjusted within the cup, said device consisting of a plate upon which the base of the resilient cushion rests, and a screw engaging threads in said expanding keys whereby the plate may be advanced within the cup.

6. A tire comprising a casing, flexible followers supporting the interior of the casing and having projecting webs on their inner surfaces and yielding supports for the followers having channeled portions to receive said webs edgewise.

7. A tire comprising a casing, flexible followers supporting the interior of the casing, said followers having projecting webs along the center of their inner surface, and yielding supports for the followers, and footplates between the supports and followers and having channeled surfaces to receive edgewise the projecting webs of said followers.

In testimony whereof I have hereunto set my hand in the presence of two subscribing witnesses.

MARSHALL C. ROGERS.

Witnesses:
G. B. TIBBOT,
EUGENE KELLEY.